(12) United States Patent
Thong et al.

(10) Patent No.: US 7,864,644 B2
(45) Date of Patent: Jan. 4, 2011

(54) OPTICAL STORAGE MEDIUM READING/WRITING METHOD AND DEVICE WITH IMPROVED RELIABILITY

(75) Inventors: Chee Kang Thong, Singapore (SG); Rain Zhang, Singapore (SG); Bin Chye Lim, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 537 days.

(21) Appl. No.: 11/915,411

(22) PCT Filed: May 16, 2006

(86) PCT No.: PCT/IB2006/051541

§ 371 (c)(1), (2), (4) Date: Nov. 26, 2007

(87) PCT Pub. No.: WO2006/129216

PCT Pub. Date: Dec. 7, 2006

(65) Prior Publication Data

US 2008/0186821 A1    Aug. 7, 2008

(30) Foreign Application Priority Data

May 30, 2005  (EP) ................................. 05104621

(51) Int. Cl.
*G11B 11/00* (2006.01)

(52) U.S. Cl. .................... 369/53.13; 369/53.3

(58) Field of Classification Search ................... None
See application file for complete search history.

(56) References Cited

U.S. PATENT DOCUMENTS

| 4,465,977 | A | 8/1984 | Lopez de Romana |
| 6,493,169 | B1 | 12/2002 | Ferris et al. |
| 2005/0007918 | A1* | 1/2005 | Tokudome et al. ....... 369/47.36 |

FOREIGN PATENT DOCUMENTS

| JP | 57205861 A | 12/1982 |
| JP | 05109180 A | 4/1993 |
| JP | 06020380 A | 1/1994 |
| JP | 10011956 A | 1/1998 |

* cited by examiner

*Primary Examiner*—Paul Huber

(57) ABSTRACT

A method and device are disclosed for improving reliability of reading an optical storage medium, such as an optical disc (20). A disc spin speed value (31) of the optical disc (20) is provided and an unnormal value of said disc spin speed value (31), which differs from a disc spin speed value within a range of nominal disc spin speed values, is detected, indicating normal spinning operation of said optical disc (20). By using this method, the spinning loss of an optical disc, e.g. due to insufficient disc clamping force, is detected fastly and reliably, in a manner resulting in a reduced risk of damaging the disc and disc reader during such spinning loss. Further actions may be taken in both cases, including disabling the drive in order to prevent damage of the disc or to thwart such illegal usage.

5 Claims, 3 Drawing Sheets

OPTICAL STORAGE MEDIUM READING/WRITING METHOD AND DEVICE WITH IMPROVED RELIABILITY

This invention pertains in general to the field of optical storage media. More particularly the invention relates to optical discs, and even more particularly to an optical disc reading/writing method and device having improved reliability.

In optical recording various generations of optical discs are succeeding each other, depending on physical parameters like wavelength and NA of the objective lens.

In the 12 cm world, CD was first, then DVD, now Blu-ray Disc (BD) and/or HD-DVD and/or other versions like the Chinese proposal EVD.

All disc formats have in common that an optical disc is rotated, driven by a spindle motor, for accessing the disc by means of an optical system scanning an information layer during rotation of the disc.

In conventional optical disc drives, such as a DVD player, there is no implementation to detect the sudden loss of rotation of a spinning disc during normal operation. The drive reacts to such events by performing focus/tracking servo recoveries. However, this reaction is rather slow and not well suited for all purposes.

For instance, in the case of disc loss due to an insufficient clamping force on the disc, the disc drive can damage the displaced disc in its attempt to perform servo recoveries. Clamping force may be lost due to external vibrations or shock or internal control circuit problems of the drive.

Another such situation is the case of a user trying to remove a spinning disc and quickly replace it with another disc, e.g. for piracy purposes. Also in this case, a conventional disc drive assumes that focus and/or radial errors exist, performs a recovery, and then it will continue as per normal once the servo recovery succeeds, which in this case means with the second disc.

Hence, conventional optical disc drives have reliability problems during reading from and/or writing to optical storage media, such as optical discs, in certain conditions.

Therefore, a reading and/or writing system for optical storage media having improved reliability would be advantageous.

Accordingly, the present invention preferably seeks to mitigate, alleviate or eliminate one or more of the above-identified deficiencies in the art and disadvantages singly or in any combination and solves at least the above mentioned problems, at least partly, by providing a method, a device, and a computer-readable medium according to the appended patent claims.

According to aspects of the invention, a method, an apparatus, a signal, and a computer-readable medium for improving reliability of reading an optical storage medium, such as an optical disc, are disclosed.

More particularly, a method of improving reliability of reading an optical storage medium is provided according to a first aspect of the invention. The method comprises providing a spin speed value of said optical storage medium and detecting an unnormal value of said spin speed value, wherein said unnormal value differs from a spin speed value within a range of nominal spin speed values that indicate a normal spinning operation of the optical storage medium.

According to an embodiment, the spindle tacho signal of an optical disc drive is utilized to detect the sudden loss of the spinning optical disc during normal optical drive operation. By using this method, the spinning loss of an optical disc, e.g. due to insufficient disc clamping force, is detected fastly and reliably, in a manner resulting in a reduced risk of damaging the disc and disc reader during such spinning loss. Using the same method, any attempt by a user to remove a spinning disc after a copy-protection authentication and quickly replace it with another disc, e.g. for piracy purposes, will be detected. Further actions may be taken in both cases, including disabling the drive in order to prevent damage of the disc or to thwart such illegal usage.

According to a further aspect of the invention, an optical storage medium reading and/or writing apparatus having improving reliability of reading from and/or writing to an optical storage medium, such as an optical disc, is provided. The apparatus comprises means for providing a spin speed value of said optical storage medium, and means for detecting an unnormal value of said spin speed value, differing from a spin speed value within a range of nominal spin speed values indicating normal spinning operation of said optical storage medium, wherein said means are operatively connected to each other.

According to yet another aspect of the invention, a computer-readable medium having embodied thereon a computer program for improving reliability of reading an optical storage medium, for processing by a computer is provided. The computer program comprises a code segment for providing a spin speed value of said optical storage medium, and a code segment for detecting an unnormal value of said spin speed value, differing from a spin speed value within a range of nominal spin speed values indicating normal spinning operation of said optical storage medium.

The present invention has the advantage over the prior art that it is provides an easy to implement method avoiding the need of unnecessarily modifying existing drives for accessing optical storage media, such as optical discs. Moreover, the method has good practical usages, as indicated above.

These and other aspects, features and advantages of which the invention is capable of will be apparent and elucidated from the following description of embodiments of the present invention, reference being made to the accompanying drawings, in which FIG. 1 is a schematic illustration of a an optical disc reader according to an embodiment of the invention;

Figure 1:
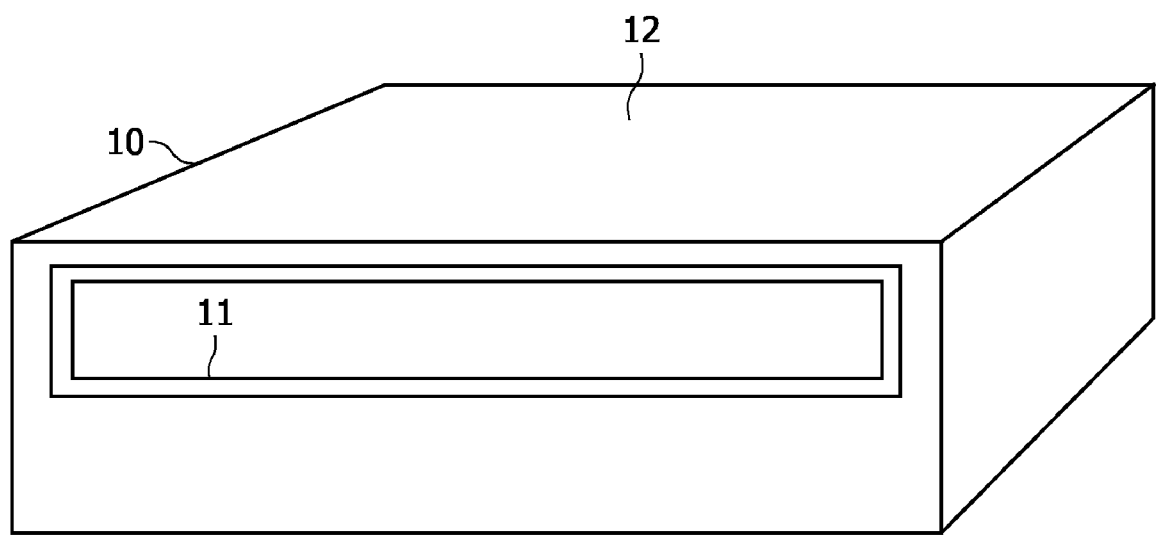
Figure 2:
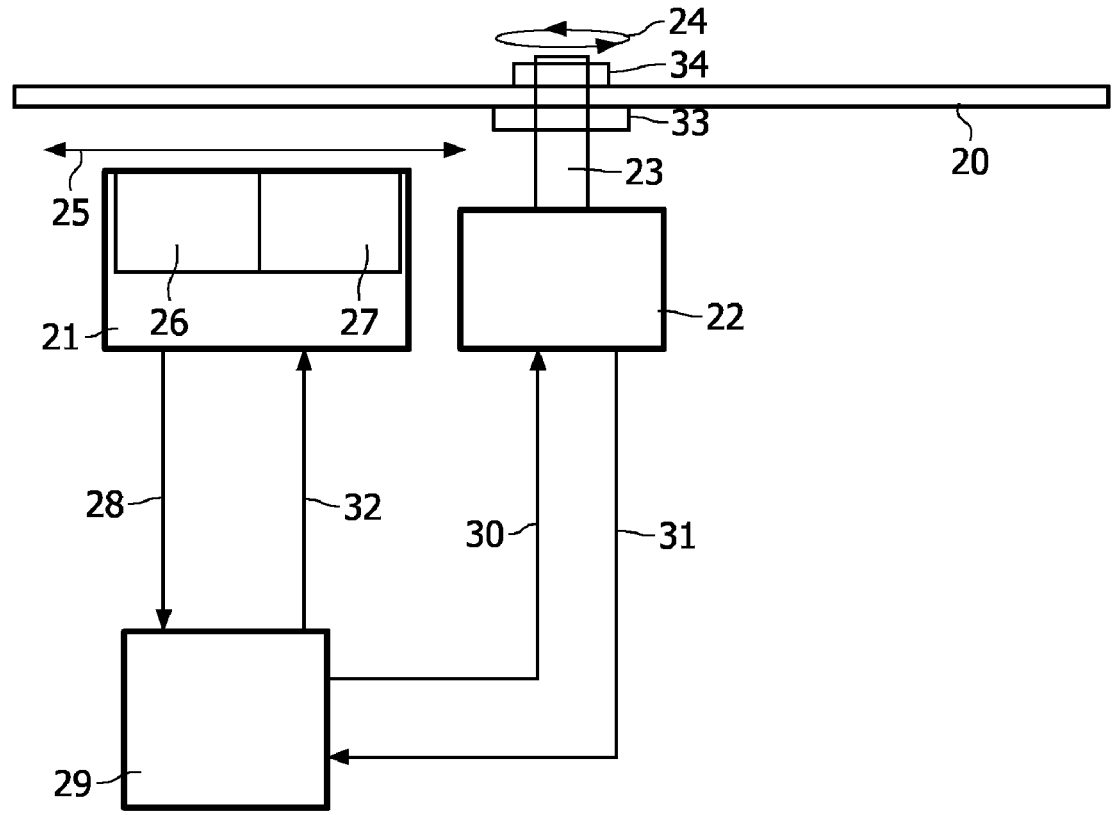
FIG. 2 is a schematic illustration of an optical disc reader for accessing an optical disc according to an embodiment of the invention.

In an embodiment of the invention according to FIGS. 1 and 2, an optical disc reading device 10 for accessing an optical disc 20 is provided. The device 10 is for instance a reader for DVD discs and comprises a tray 11 or other suitable arrangement for feeding a disc 20 into a housing 12 of optical disc reading device 10. The device is for instance a drive of a computer or a consumer player for discs 20. The optical medium 20 to be accessed by means of the drive 10 comprises at least one information storing layer to be accessed by device 10. The device comprises means 21 for accessing such a disc 20, e.g. a laser pickup.

More precisely, a disc drive assembly 22,23 in the form of a spindle motor 22 and a rotatable spindle 23 is adapted to rotate the optical disc 20 in a direction indicated by arrow 24 in FIG. 2, in a manner which is well known in the art. A laser pickup unit 21 is positioned close to the surface opposite the label side of the optical disc 20 and is movable in a radial direction of the optical disc 20, as is indicated by the arrow 25 in FIG. 2. The laser pickup unit 21 operates to irradiate the optical disc 20 with a beam of laser light, detect reflections from the optical disc, produce a readout signal in response thereof and provide this signal for further processing. When accessing information from the disc, the optical disc 20 will be kept in rotation by the disc drive, i.e. the spindle motor 22 and the spindle 23.

The laser pickup unit 21 comprises mechanical drive means 26 for causing the optical assembly or optical read device 27 of the laser pickup unit 21 to move radially along the surface of the optical disc 20 in the direction of arrow 25 indicated in FIG. 2 between different radial positions. However, such mechanical drive means 26 are well known per se in the technical field, and it is left to the skilled person to choose the suitable mechanical and electrical components, such as an electric motor and a mechanical carriage arrangement, depending on an actual implementation. In essence, any equipment will do, which is capable of making the optical components 27 of the laser pickup unit 21 move with high precision in the desired radial direction. Furthermore, the laser source may be chosen among a variety of commercially available components and may operate in a desired wavelength range, for instance at about 800 nm (infrared) for a CD, 650 nm (red) for a DVD or 405 nm (blue) for a BD.

The output signal from the laser pickup unit 21 is a high frequency (HF) information signal 28 that arises from the scattering, absorption and reflection of the actual pit and land pattern present in a track on an information layer of the disc 20. A processing device, such as a processor, 29 of the drive 10 may be implemented by any commercially available microprocessor. Alternatively, another suitable type of electronic logic circuitry, for instance an Application-Specific Integrated Circuit (ASIC) or a Field-Programmable Gate Array (FPGA) may substitute the processor 29. Correspondingly, further components, such as memory, input devices and output device of the drive (not illustrated) may all be implemented by commercially available components and are not described in any detail herein.

Figure 3:
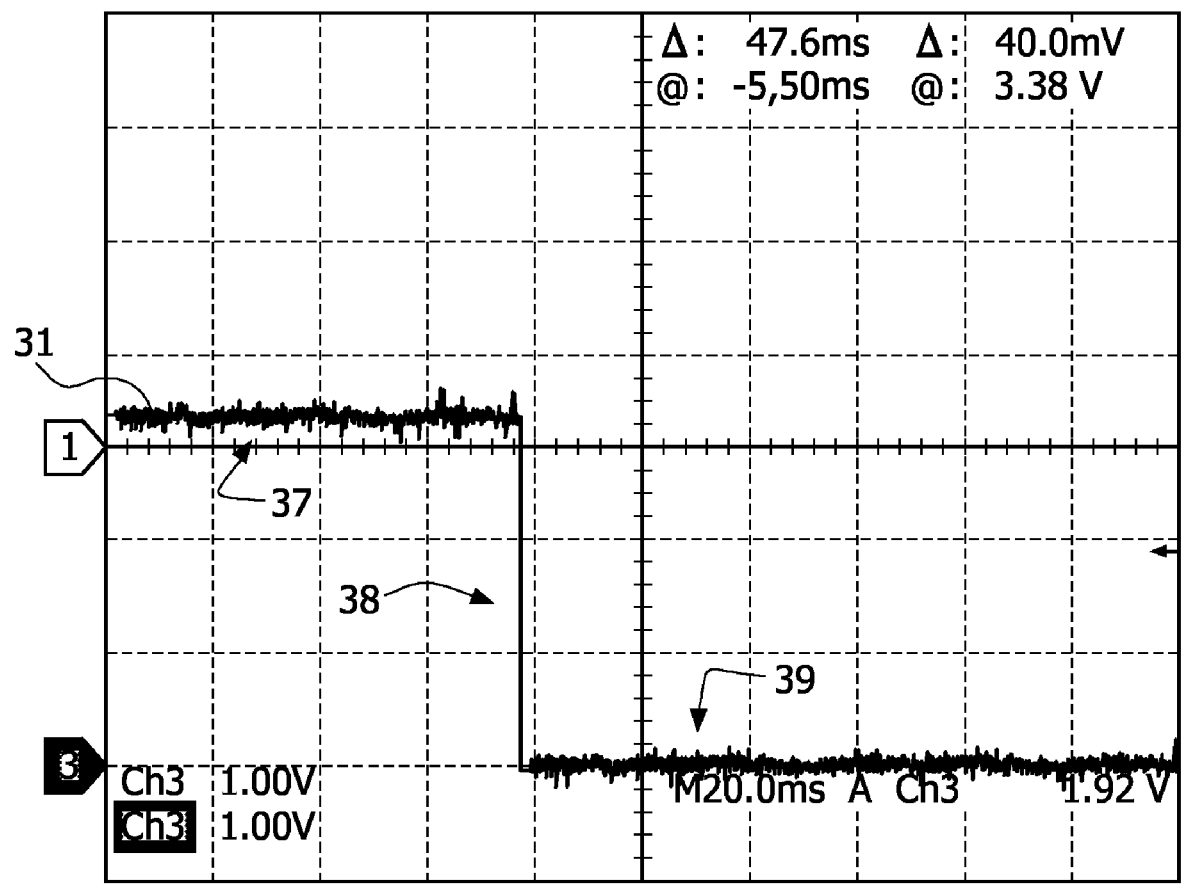
FIG. 3 is a schematic view illustrating the deviation of a spindle tacho signal in the event of a sudden spinning disc loss.

The processor 29 controls the function of drive 10. For instance, the processor controls the rotational speed of motor 22, as indicated by signal lines 30, 35, wherein signal line 35 carries the spindle tacho signal 31 for which a typical graph during spinning loss of disc 20 is shown in FIG. 3; the radial position of the pickup unit 21, as indicated by signal line 32; and receives the HF signal 28 for further processing, e.g. for decoding and sending to an audio-visual unit for presentation of audio-visual data read from disc 20.

When disc 20 is loaded into player 10, it is positioned, e.g. by means of a loading motor operating tray 11, to a point where the hole in the center of the disc is directly over the spindle table 33, and the disc 20 will be clamped down onto the spindle table 33 of spindle 23. The spindle table 33 may be mounted directly on the shaft of the spindle motor 22, i.e. the motor which spins the disc. The disc may be clamped by spring tension or by magnetic attraction to the spindle table. When player 10 wants to access disc 20, the laser pickup 27 is moved to a reading position, then processor 29 activates power to the spindle motor 22 and focuses the laser of pickup 27 on the layer of the disc 20 where the information is stored. The spindle motor is for instance a dc brush type motor.

A magnetic clamp holds the disc 20 in place when the magnet 34, usually built into the upper half of the clamp, pulls down to the spindle table 22, while sandwiching the disc 20 between them.

In conventional optical disc drives, such as a DVD player, there is no implementation to detect the sudden loss of rotation of a spinning disc during normal operation. The drive reacts to such events by performing focus/tracking servo recoveries. However, this reaction is not well suited for all purposes.

For instance, in the case of disc loss due to an insufficient clamping force on the disc, the disc drive can damage the displaced disc in its attempt to perform servo recoveries. Clamping force may be lost due to external vibrations or shock or internal control circuit problems of the drive.

Another such situation is the case of a user trying to remove a spinning disc and quickly replace it with another disc, e.g. for piracy purposes. Also in this case, a conventional disc drive assumes that focus and/or radial errors exist, performs a recovery, and then it will continue as per normal once the servo recovery succeeds, which in this case means with the second disc replacing the first disc. In this way copy protection arrangements may be circumvented, for instance when the first disc is read as normal until for instance a decoding key is loaded into a memory of disc drive 10, e.g. a cache memory of processor 29. This decoding key will still be in the memory when the first disc is removed and replaced by the second disc during the tracking error correction routines of the drive 10. The present invention facilitates preventing such procedures, which are illegal in most countries.

Figure 4:
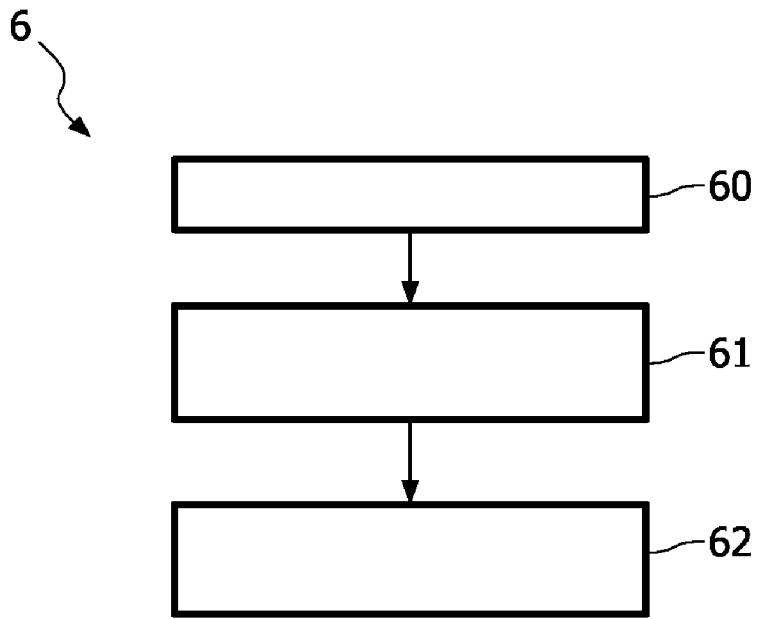
FIG. 4 is a flowchart illustrating a method for improving reliability of a disc reader according to an embodiment of the invention.

In an embodiment of the method according to the invention according to FIG. 4, the spindle tacho signal is utilized to detect the sudden loss of the spinning optical disc during normal optical drive operation. FIG. 3 is a schematic view illustrating the deviation of a spindle tacho signal 31 in the event of a sudden spinning disc loss (at 38). In FIG. 3 the horizontal axis shows the time axis and the vertical axis shows the spindle tacho signal amplitude, corresponding to the amplitude of the signal on line 35 of FIG. 2. During normal operation, i.e. after the disc has been properly spinned up, the spindle tacho signal will be oscillating within a small range of frequencies, as indicated at 37 in FIG. 3, i.e. within a certain frequency band. However, the averaged value of the signal might have different absolute values (offset), depending on the rotational speed of disc 20 and hence the speed of spindle motor 22.

In the event of a sudden disc loss, as indicated at position 38 in FIG. 3, the oscillating frequencies of the spindle tacho signal 31 will deviate significantly from this normal range of frequencies, as indicated at 37 in FIG. 3, and change to a significantly different range and offset, as indicated at 39. By detecting this deviation, the optical drive is able to detect a sudden disc loss and react accordingly to either reduce rotational speed of the spindle motor 22, stop the spindle motor 22 immediately or disable the drive 10 totally.

As shown in FIG. 4, the method 6 of improving reliability of reading an optical disc 20 in a reader 10, comprises a step 60 of reading a spindle tacho signal value 31 during operation of an optical disc drive 10 configured reading said optical disc 20, i.e. a disc spin speed value of the optical disc 20 is provided. In a further step 61, an unnormal value 39 of said disc spin speed value 31, differing from a disc spin speed value 37 within a range of nominal disc spin speed values indicating normal spinning operation of the optical disc 20, is detected, for instance in the above described ways. Hence, the unnormal value 39 of said disc spin speed value 31 is utilized for step 62, comprising detecting a sudden spinning loss 38 of the spinning optical disc 20 during normal operation of optical disc drive 10.

The method 6 may determine or detect the unnormal value of said disc spin speed value, differing from a disc spin speed value within a range of nominal disc spin speed values indicating normal spinning operation of said optical disc, by comparing the disc spin speed value of said optical disc with a predetermined threshold value, wherein said disc spin speed value 31 of said optical disc 20 is an unnormal value of said disc spin speed value if said disc spin speed value 31 of said optical disc 20 is less than said predetermined threshold value.

Alternatively, an unnormal value of said disc spin speed value, differing from a disc spin speed value within a range of nominal disc spin speed values indicating normal spinning operation of said optical disc, may be detected by flank triggering said unnormal disc spin speed value 31 of said optical disc 20 when the disc spin speed value of said optical disc changes more than a predetermined amount per time unit or spin speed value 31 of said optical disc 20. This means that the jump 38 is detected, e.g. by detecting the slope and the change in the absolute value of signal 31.

The method 6 may be utilized for detecting an insufficient disc clamping force causing such a sudden loss of spinning speed. Counter action may be taken, including reducing the spinning speed of said optical disc drive or ceasing operation of said optical disc drive, whereby the risk of damaging the optical disc and/or the optical disc drive during such spinning loss is reduced or eliminated.

Furthermore, the method 6 may be utilized for detecting a sudden removal of the optical disc 20 from the optical disc drive 10. In this case, the detected unnormal value of the disc spin speed is used for taking counter action, including ceasing operation of said optical disc drive, when said unnormal value of said disc spin speed is repeatedly detected during a predetermined time, which indicates a loss of spinning which is longer than e.g. caused by external vibrations. More precisely, it may be detected that the jump 38 from the nominal tacho value range 37 to unnormal range 38 is not compensated within a certain amount of time, and does not rise back to a level 37 of nominal spinning operation. Thus reliability of said optical disc drive is increased, thwarting illegal usage thereof.

Figure 5:
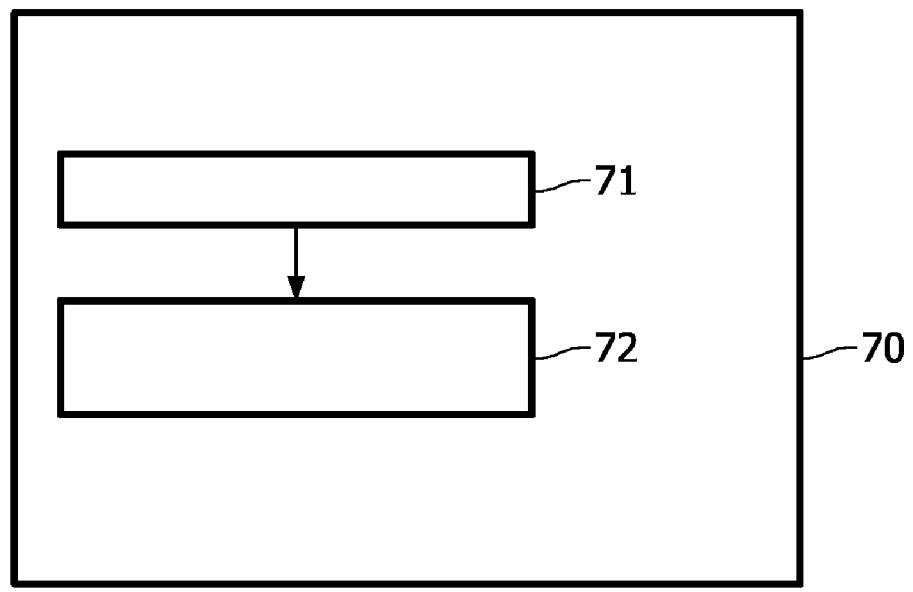
FIG. 5 is a schematic illustration of a computer readable medium comprising program code segments for improving reliability of a disc reader according to another embodiment of the invention.

A further embodiment of the invention is illustrated in FIG. 5, showing a computer-readable medium 70 having embodied thereon a computer program for improving reliability of reading an optical disc, for processing by a computer, the computer program comprising a code segment 71 for providing a disc spin speed value of said optical disc, and a code segment 72 for detecting an unnormal value of said disc spin speed value, differing from a disc spin speed value within a range of nominal disc spin speed values indicating normal spinning operation of said optical disc.

The method of the invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different spindle motors than those described above, storage media of different formats as e.g. credit card shapes, etc.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method of improving reliability of reading an optical storage medium, said method comprising
    providing a spin speed value of said optical storage medium by reading a spindle tacho signal value during operation of an optical drive configured for reading from or writing to said optical storage medium;
    detecting an abnormal value of said spindle tacho signal value, differing from a spin speed value within a range of nominal spin speed values indicating normal spinning operation of said optical disc, wherein the abnormal value of said spindle tacho signal value is used to detect a sudden spinning loss of the spinning optical storage medium during operation of the optical drive, and to detect a sudden removal of said optical storage medium from said optical disc drive; and
    taking counter action, including ceasing operation of said optical drive when said abnormal value of said spin speed is repeatedly detected during a predetermined time, thereby increasing reliability of said optical drive thwarting illegal usage thereof.

2. The method as claimed in claim 1, wherein said detecting an abnormal value of said spindle tacho signal value, differing from a spin speed value within a range of nominal spin speed values indicating normal spinning operation of said optical storage medium, comprises
    comparing said spindle tacho signal value of said optical storage medium (20) with a predetermined threshold value, wherein said spindle tacho signal value of said optical storage medium is an abnormal value when said spindle tacho signal value of said optical storage medium is less than said predetermined threshold value.

3. The method according to claim 1, wherein said detecting an unnormal value of said spindle tacho signal value, differing from a spin speed value within a range of nominal spin speed values indicating normal spinning operation of said optical storage medium, comprises
    said spindle tacho signal value of said optical disc flank triggering said abnormal spin speed value of said optical storage medium when the spindle tacho signal value of said optical storage medium changes more than a predetermined amount per time unit or spin speed value of said optical storage medium.

4. An optical storage medium reading and/or writing apparatus having improving reliability of reading from or writing to an optical storage medium, said apparatus comprising:

means for providing a spin speed value of said optical storage medium by reading a spindle tacho signal value during operation of an optical drive configured for reading from or writing to said optical storage medium;

means for detecting an abnormal value of said spindle tacho signal value, differing from a spin speed value within a range of nominal spin speed values indicating normal spinning operation of said optical storage medium, wherein the abnormal value of said spindle tacho signal value is used to detect a sudden spinning loss of the spinning optical storage medium during operation of the optical drive, and to detect a sudden removal of said optical storage medium from said optical disc drive; and means for taking counter action, including means for ceasing operation of said optical drive, when said abnormal value of said spin speed is repeatedly detected during a predetermined time, thus increasing reliability of said optical drive thwarting illegal usage thereof, wherein said means are operatively connected to each other.

5. A computer-readable medium having embodied thereon a computer program for improving reliability of reading from and/or writing to an optical storage medium, for processing by a computer, the computer program comprising:

a code segment for providing a spin speed value of said optical storage medium by reading a spindle tacho signal value during operation of an optical drive configured for reading from or writing to said optical storage medium;

a code segment for detecting an abnormal value of said spindle tacho signal value, differing from a spin speed value within a range of nominal spin speed values indicating normal spinning operation of said optical storage medium, wherein the abnormal value of said spindle tacho signal value is used to detect a sudden spinning loss of the spinning optical storage medium during operation of the optical drive, and to detect a sudden removal of said optical storage medium from said optical disc drive; and a code segment for taking counter action, including ceasing operation of said optical drive, when said abnormal value of said spin speed is repeatedly detected during a predetermined time, thus increasing reliability of said optical drive thwarting illegal usage thereof.

* * * * *